Patented Sept. 14, 1943

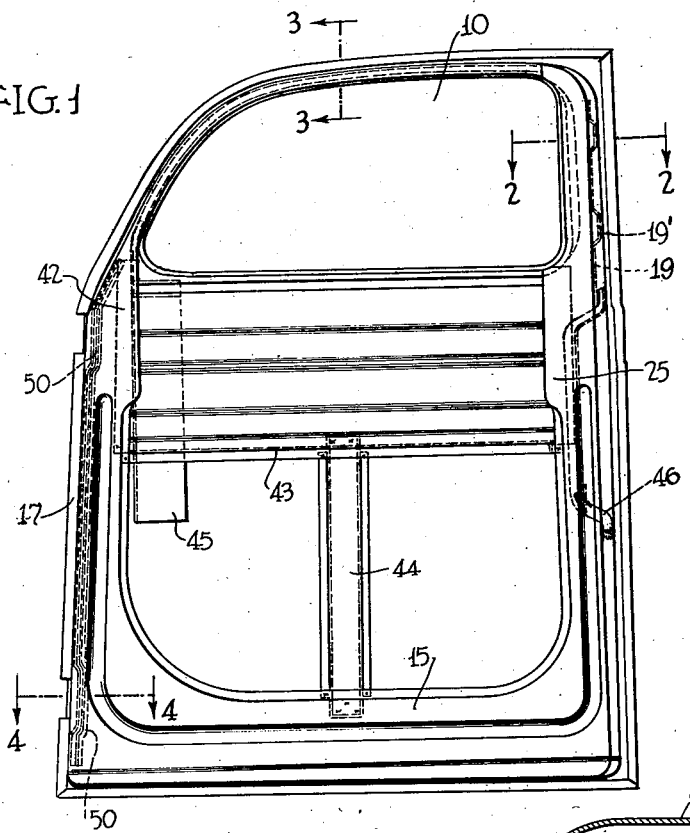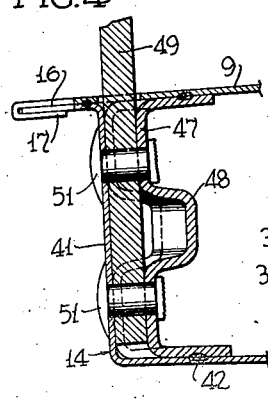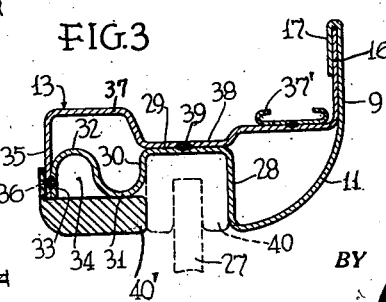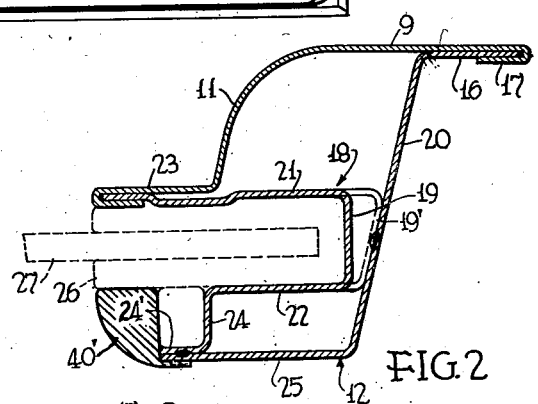

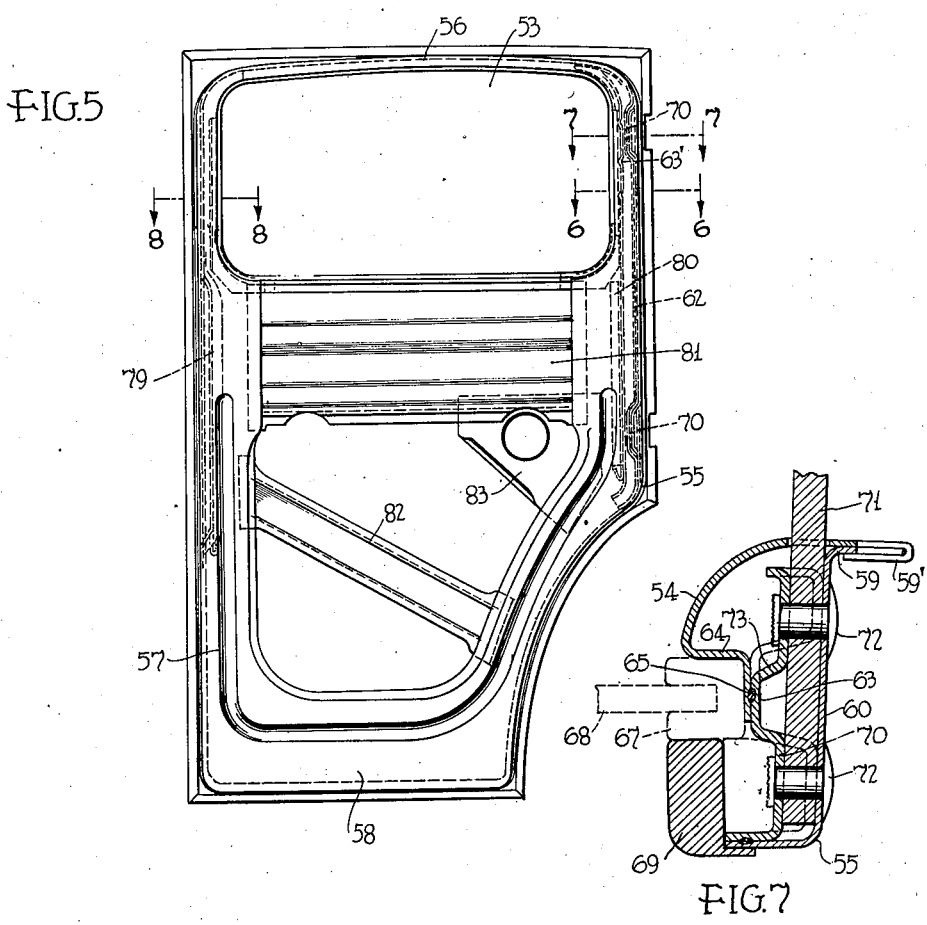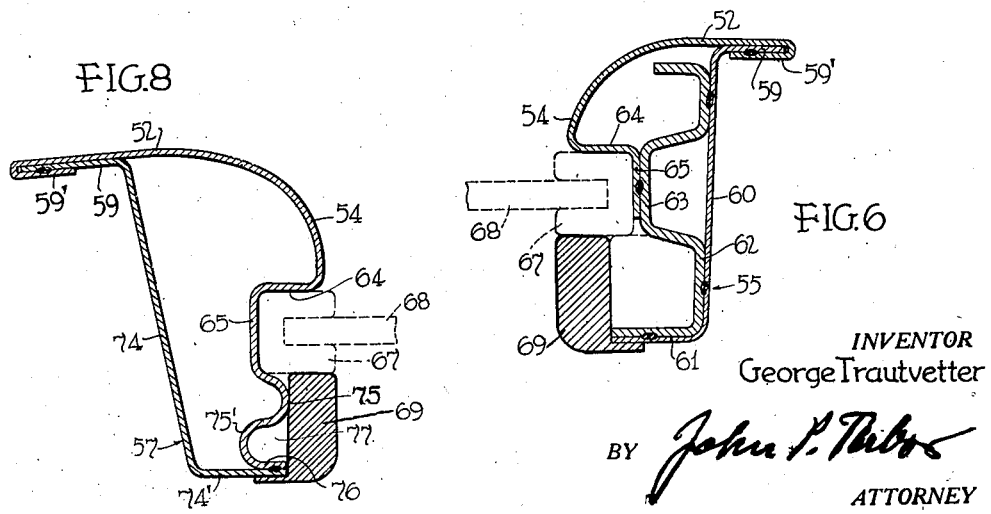

2,329,494

UNITED STATES PATENT OFFICE 2,329,494

VEHICLE WALL, ESPECIALLY DOOR STRUCTURE

George Trautvetter, Philadelphia, Pa., assignor to Edward G. Budd Manufacturing Company, Philadelphia, Pa., a corporation of Pennsylvania Application November 29, 1939, Serial No. 306,592

1 Claim. (Cl. 296—44)

The invention relates to a vehicle wall structure such as a vehicle door, and more particularly to such a structure comprising a window frame.

It is among the objects of the invention to create a structure of the indicated type which is simple, comparatively light in weight yet nevertheless strong and which can easily and inexpensively be manufactured. A more specific object of the invention is to give the parts entering the structure such a shape that they can cheaply be manufactured by die stamping operations and that they lend themselves to be easily assembled into the final structure by spot welding.

Further objects and advantages as well as the details of the invention will become apparent from the embodiments shown in the attached drawings when read together with the following description thereof. In the drawings:

Fig. 1 is an inside view of an automobile front door.

Figs. 2, 3, and 4 are sections at a larger scale along the correspondingly numbered section lines of Fig. 1 and viewed in the direction of the arrows.

Fig. 5 is an inside view of an automobile rear door.

Figs. 6, 7 and 8 are sections at a larger scale along the correspondingly numbered section lines of Fig. 5 and viewed in the direction of the arrows.

The front door shown in Figs. 1 to 4 comprises an outer panel or facing member 9 preferably of sheet metal which is provided around the window opening 10 with an inturned flange 11 so as to form an outer garnish moulding. The door frame comprises a lock rail 12, an upper rail 13, a hinge rail 14 and a bottom rail 15. These rails are provided along their outer margins with a laterally extending flange 16 around which the outer panel is crimped at 17 in the usual way and is fastened thereto as by spot welding.

As shown in Fig. 2, a deep channel member 18 has projections 19' of its bottom wall 19 rest against and fastened, as by spot welding, to the inner surface of the web 20 of the lock rail 12. The side walls 21 and 22 of this channel extend in the direction of the main plane of the door. A flange 23 which is bent off from the flange 11 of the outer panel overlaps and rests against the outer side wall of the channel and has its free margin crimped around the free edge of this wall and fastened thereto. The free margin of the inner wall 22 is provided with inwardly and outwardly bent off flanges 24, 24' and the flange 24' rests against and is fastened as by spot welding to the free edge of the lateral flange 25 which is provided along the inner edge of the lock rail 12. All connecting points between the channel 18, the outer panel 9, and the lock rail 12 are, as obvious, easily accessible for making those connections. The channel carries a window guide lining 26 of any suitable material, such as felt or fabric covered rubber, this lining forming a guide for a vertically and horizontally reciprocable window pane 27.

The cross section shown in Fig. 3 extends from about the lower forward corner of the window opening to about the upper rear corner thereof. The outer panel 9 is, inwardly continued beyond the garnish moulding section 11 by portions 28 to 33. The portion 28 extends from the inner edge of the portion 11 in the direction of the main plane of the door and away from the window opening. The portion 29 is inwardly bent off from the portion 28. The portion 30 is arranged parallel to but inwardly spaced from the portion 28 and is of less height than the latter. The wall 30 is reversely bent thereby constituting a bead 31. The portions 31 and 32 are together in cross section substantially S shaped and form oppositely directed channels, of which the channel formed by the outer portion faces away from the center of the window opening whereas the channel 34 formed by the portion 32 faces toward the middle of the window opening. The end portion or flange 33 forming a part of the wall of the channel 34 overlaps an inner arm 35 of the top rail 13 and these overlapping parts are connected with each other at 36 as by spot welding. The flange 33 is spaced from the bead 31 sufficiently to permit the entry of a spot welding electrode for connecting it to the flange 35 of the top rail 13. The transversely extending web 37 of the top rail 13 is provided with a longitudinal depression 38 which rests against the portion 29 and is connected therewith at 39 as by spot welding. The member 37' which is fastened to the outside of the web 37 serves for holding a weatherstrip. The portions 28, 29 and 30 form together a channel for holding a weatherstrip 40 for the window pane 27. A removable garnish moulding 40' shown in Figs. 2 and 3 allows the insertion and the replacement of the window 27.

The web of the hinge rail is designated by the numeral 41 in Fig. 4 and is provided along its inner edge with a flange 42 which extends toward the middle of the door. A panel 43 is fastened to the flanges 25 and 42 of the lock rail 12 and the hinge rail 14 respectively and serves for supporting the, not shown, door lock and the window regulator, and serves besides for the reinforcement of the entire door structure. Further reinforcement is effected by a brace 44 between said panel 43 and the lower door rail 15. Guides 45 and 46 for the window pane 27 in the lower section of the door are fastened in a suitable manner to the adjacent door rails or the panel 43 respectively.

The hinge rail is reinforced in the interior of the door by a channel member 47, which for further strengthening is provided with a central oppositely facing channel portion 48. The main portion of this member 47 rests against and is fastened to the inner surface of the web 41 of the hinge rail. At the location of the hinges, the rail 47 is offset as at 50 thereby allowing the insertion of the hinge band 49 in the space between the web 41 and of said portions 50. The fastening of the hinge may be accomplished in the usual manner such as by rivets 51.

The rear door, shown in Figs. 5 to 8, is in its structure very similar to the structure of the front door. An outer panel 52 is provided with a window opening 53 and its margins around this opening are bent inwardly to form an outer garnish moulding 54. The door frame comprises the hinge rail 55, the top rail 56, the lock rail 57 and the bottom rail 58. These rails are provided with an outer laterally extending flange 59 around which the outer margin 59' of the outer panel is crimped and then fastened thereto as by spot welding.

The hinge rail 55 comprises a web portion 60 and an inner flange 61. A U-shaped rail 62 has its bottom wall fastened as by spot welding to the web 60. The middle portion of this reinforcing rail 62 is offset at 63 away from the web 60. The garnish moulding portion 54 of the outer panel has its inner margin bent off laterally at 64 and then inwardly at 65. The bent off flange 65 rests upon and is fastened to the offset portion 63 of the reinforcing rail 62. The portions 64 and 65 support a weatherstrip 67 for a window pane 68. This weatherstrip together with the window is additionally held in place by a removable inner garnish moulding 69. The bottom wall of the channel member 62 is in the regions 70 transversely offset yet to a lesser degree than the offset 63. The spaces between these transverse offsets 70 and the web 60 of the rail 55 serve for the insertion of the hinge bands 71. These bands are held in place by rivets 72. So as to allow the easy application of the rivets and the easy entry of the riveting tools, the side wall of the offset 63 may be provided with recesses 73 at the location of such rivets.

The welding connection between the offset 63 and the bottom wall 65 of the window guide channel may be accomplished, as diagrammatically indicated in Fig. 5, by projections 63' formed on said offset 63 and by then clamping the portions 63 and 65 together between welding tools whereby welding spots are formed at the location of those projections. The connection between other portions of the door may, of course, be made in the same or an analagous manner.

The cross section of the top rail 56 may be substantially the same as that of the top rail for the front door as shown in Fig. 3.

The lock rail 57 comprises, as shown in Fig. 8, a transversely extending web portion 74 and an inner flange 74'. The outer garnish moulding 54 is provided in the region of the lock rail with laterally and then inwardly extending portions 64 and 65 which correspond to the correspondingly numbered portions in the hinge rail section as shown in Figs. 6 and 7. The portion 65 is inwardly continued by a portion 75, 75' which is substantially S shape in cross section. The free margin 76 of this S sectional portion rests against and is fastened as by spot welding to the flange 74' of the lock rail. The laterally facing channel 77 which is formed by the portion 75 gives easy access for the welding tools when making the connection between the members 76 and 74'. The portions 64 and 65 support in this region again the weatherstrip 67 for the window pane 68 and these last named members are held in place by a portion of the removable inner garnish moulding 69. It will be noted that in this embodiment, the bottom wall 65 of the window guide channel is spaced from the web portion 74 of the rail. This space may however be bridged in a similar manner as shown in other figures.

Where the walls of the window guide channel and the bridging member between these walls and the inner flanges of the adjacent rails are formed integrally with the outer panel, these walls and the bridging member may be cutout, as indicated in the drawings, at the sharp corners of the window opening for the purpose of facilitating the forming of the entire member by die stamping operations.

The window guide channels which are formed in the region of the window opening 53 by the portions 64, 65 of the outer panel and the inner garnish moulding 69 are continued in the lower portion of the door by separate channel members 79 and 80 which are fastened to the web 74 of the lock rail and the offset portion 63 of the reinforcement of the hinge rail respectively. A panel 81 is fastened to the flanges 61 and 74' of the vertical door rails 55 and 75 and serves for reinforcing the door and for supporting the lock. Additional reinforcement is attained by diagonal members 82 and 83, the latter of which may serve for supporting a window regulator.

In both embodiments, the different rails may be formed separately or they may form, preferably together with the window regulator panel and the additional inner braces a one-piece stamping. On the other hand, it is no absolute necessity for the invention to form, as shown in the drawings, the outer wall and the bottom wall of the window guide channel and the connection between the bottom wall and the inner flange of the rail integrally with the outer panel. Whereas the outer wall and perhaps also the bottom wall of the window guide channel are preferably formed integrally with the outer channel, the connecting portion between these members and the inner flange of the adjacent rail may be formed by one or more separate pieces. All the members shown in the embodiments with the exception of the window pane and the weatherstrips are preferably die stamped from sheet metal but other methods of manufacture and other materials could also be used.

It is apparent that the described structures are unusually strong, partly owing to the special shape of the reinforcing rails which are fastened to the web of the hinge rails, but also on account of the S sectional bridging member between the bottom wall of the window guide channel and the inner flange of the adjacent door rail. This bridging member is not only very stiff owing to its corrugated form but it affords at the same time a portion of the inner wall of the window guide channel and lends itself for the easy connection to the adjacent rail by spot welding.

The invention is, of course, not restricted to the construction of vehicle doors in general or automobile doors in particular, but the invention is obviously applicable to the construction of the rails along window openings in other portions of a vehicle wall such as for instance along the rear quarter side window opening of an automobile.

While certain embodiments of the invention have been shown in the drawings and have been described in detail in the foregoing part of the specification, it should be understood that the invention is not limited to such details but that there exist many modifications which will offer themselves to anyone skilled in the art, and that such modifications are intended to be protected by the following claim.

I claim:

In a vehicle wall structure having a window opening, a window frame comprising a side facing member of sheet metal formed as a unitary stamping integral in cross-section comprising an outer portion constituting an outer garnish molding for the window opening, an adjoining window guide channel whose inner wall is of less depth than the outer, a bead constituted by a reverse bending of the inner wall, and finally a flange spaced from the bead a distance sufficient to permit welding and projecting toward the window opening a distance not greater than the height of the bead.

GEORGE TRAUTVETTER.